United States Patent [19]

Shimmel

[11] Patent Number: 4,715,782

[45] Date of Patent: Dec. 29, 1987

[54] HYDRAULIC CONTROL DEVICE FOR WIND TURBINE

[75] Inventor: David M. Shimmel, Tracy, Calif.

[73] Assignee: Fayette Manufacturing Corp., Tracy, Calif.

[21] Appl. No.: 812,975

[22] Filed: Dec. 24, 1985

[51] Int. Cl.⁴ .............................................. F03D 7/04
[52] U.S. Cl. ...................................... 416/32; 416/23; 416/169 R
[58] Field of Search ......... 416/32, 169 B, 23, DIG. 7, 416/135 A, 132 B

[56] References Cited

U.S. PATENT DOCUMENTS

| | | | |
|---|---|---|---|
| 2,058,500 | 10/1936 | Plucker | 416/23 X |
| 2,074,149 | 3/1937 | Jacobs | 416/23 X |
| 2,216,416 | 10/1940 | Mader | 170/135.6 |
| 2,398,713 | 4/1946 | Martin | 264/14 |
| 2,545,684 | 3/1951 | Carson | 170/160.21 |
| 2,613,072 | 10/1952 | Carson | 264/4 |
| 2,949,159 | 8/1960 | Kessler | 170/160.14 |
| 2,964,111 | 12/1960 | Morris | 170/62 |
| 2,986,222 | 5/1961 | Biermann | 170/160.2 |
| 4,082,479 | 4/1978 | Rangi et al. | 416/23 |
| 4,180,372 | 12/1979 | Lippert | 416/23 |
| 4,274,807 | 6/1981 | Kenney | 416/48 |
| 4,297,076 | 10/1981 | Donham et al. | 416/37 |
| 4,352,634 | 10/1952 | Andrews | 416/154 |
| 4,355,955 | 10/1982 | Kisovec | 416/23 |
| 4,372,732 | 2/1983 | Browning | 416/32 X |
| 4,374,631 | 2/1983 | Barnes | 416/23 |
| 4,500,257 | 2/1985 | Sullivan | 416/32 |
| 4,557,666 | 12/1985 | Baskin et al. | 416/32 |
| 4,575,309 | 3/1986 | Brown | 416/32 X |
| 4,577,666 | 12/1985 | Baskin et al. | 416/32 |

FOREIGN PATENT DOCUMENTS

| | | | |
|---|---|---|---|
| 74199 | 5/1952 | Denmark | 416/50 A |
| 32074 | 2/1982 | Japan | 416/DIG. 7 |
| 97081 | 6/1982 | Japan | 416/32 |
| 62382 | 4/1983 | Japan | 416/32 |
| 720591 | 12/1954 | United Kingdom | 416/45 |

Primary Examiner—Everette A. Powell, Jr.
Attorney, Agent, or Firm—Oblon, Fisher, Spivak, McClelland, & Maier

[57] ABSTRACT

A hydraulic speed control device for limiting the speed of a wind turbine rotor by controlling the deployment of rotor braking devices includes four fluidicly interconnected elements: one or more fluid cylinders, a relief valve, an accumulator, and a check valve. Each of the fluid cylinders is mechanically coupled between a blade and an associated rotor braking device, and controls the movement of the rotor braking device between its aligned and braking positions. The relief valve opens to fluidicly connect the fluid cylinders and the accumulator when the rotational speed of the rotor exceeds a limit value. The accumulator receives fluid through the relief valve when the relief valve opens, thereby reducing the fluid pressure in the fluid cylinders and allowing the rotor braking devices to move from their aligned positions to their braking positions. The check valve permits fluid flow from the accumulator toward the fluid cylinders to return the rotor braking devices to their aligned positions when the rotational speed of the rotor has sufficiently slowed.

7 Claims, 11 Drawing Figures

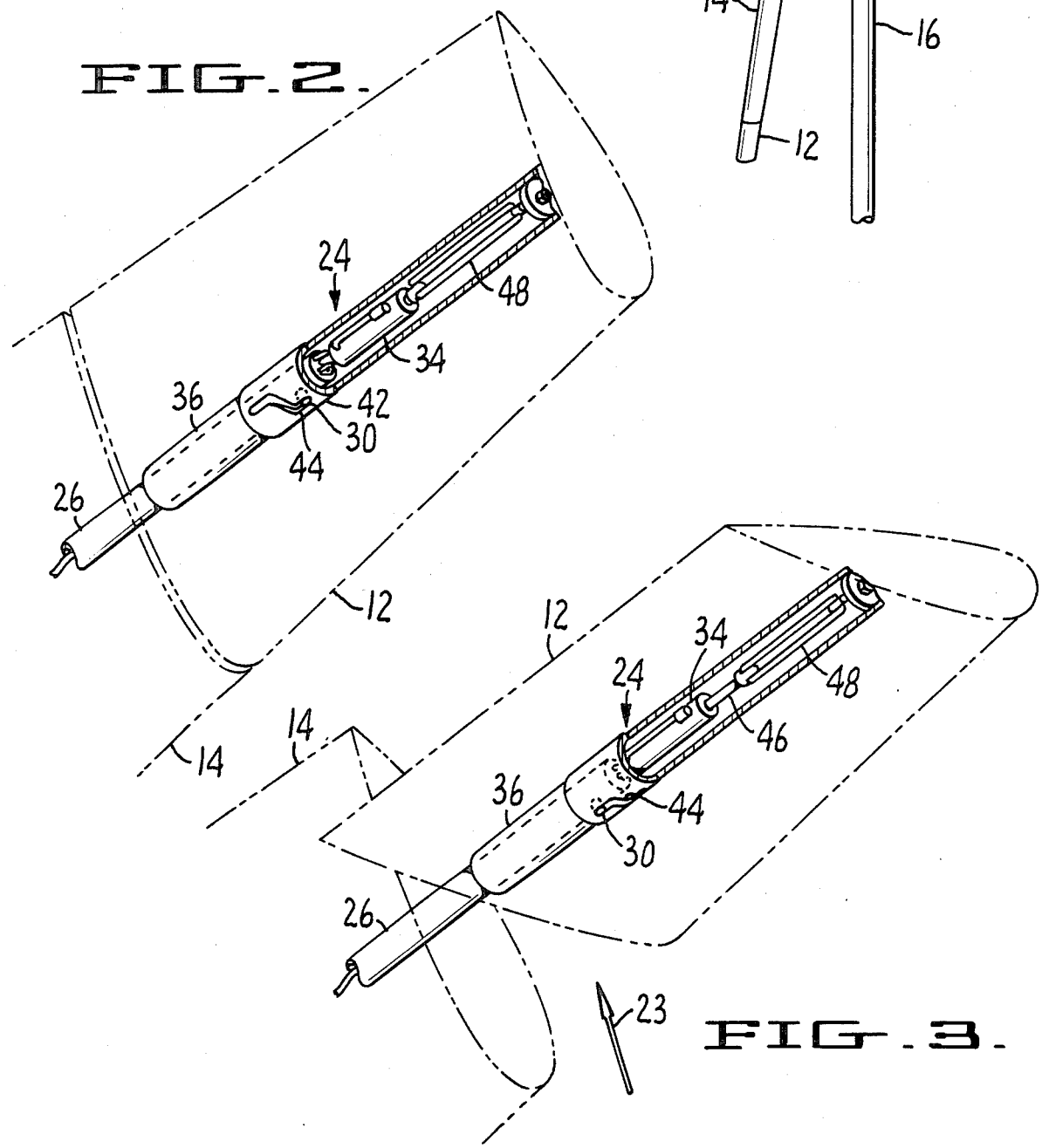

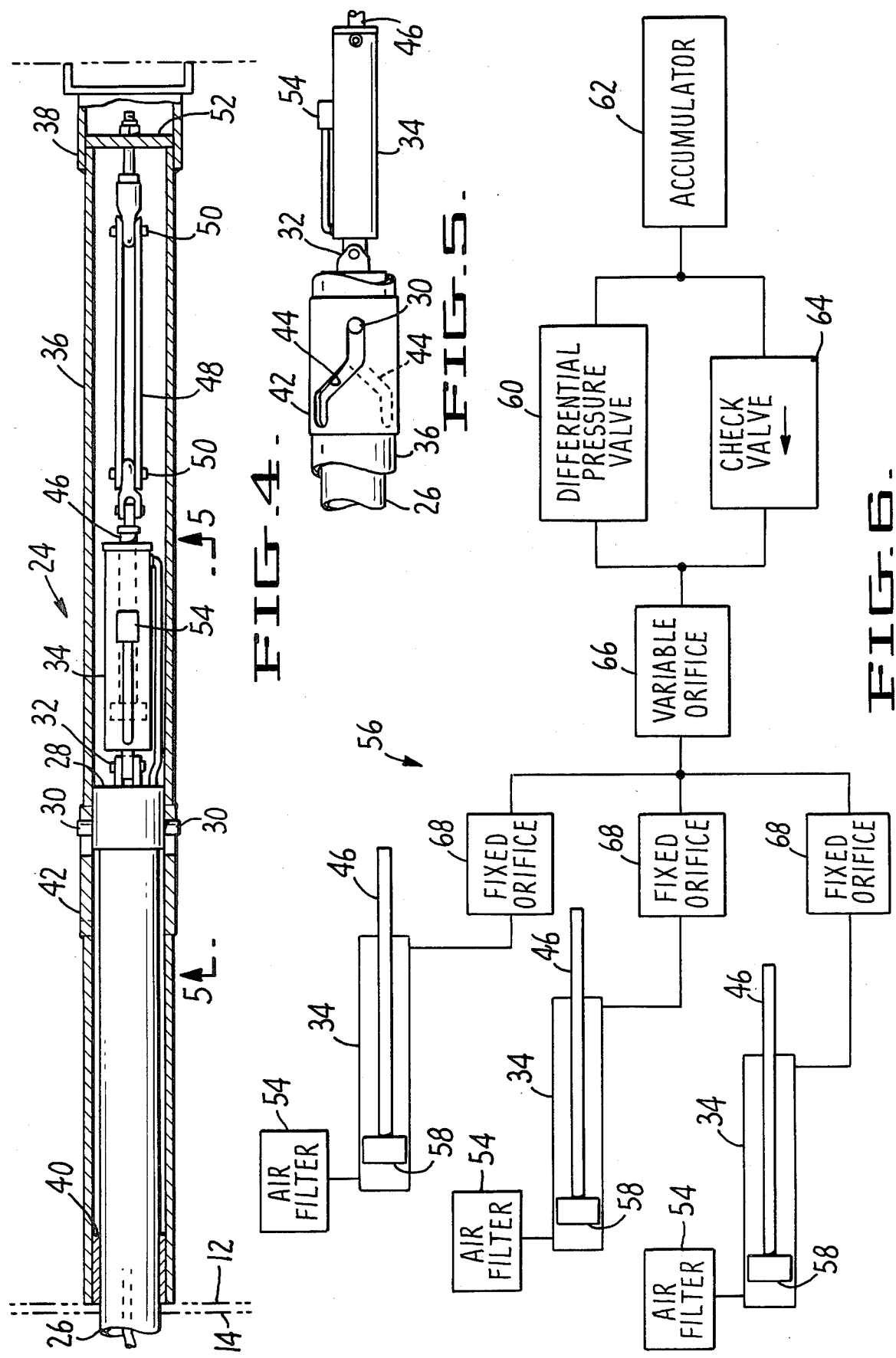

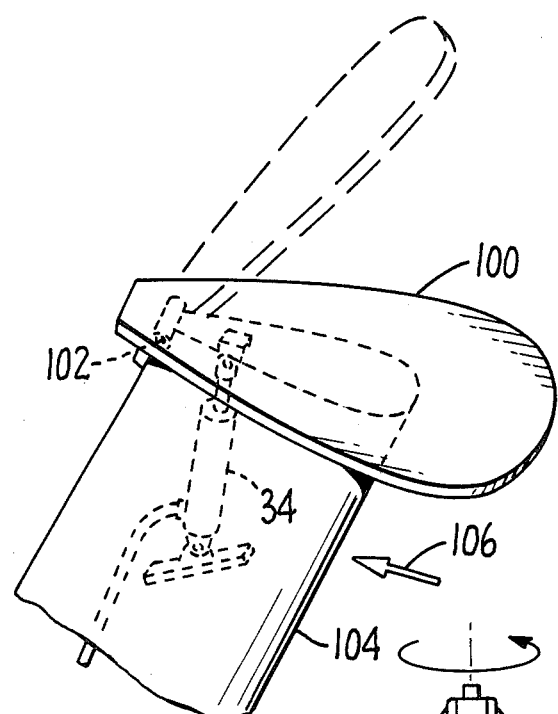
FIG. 7.
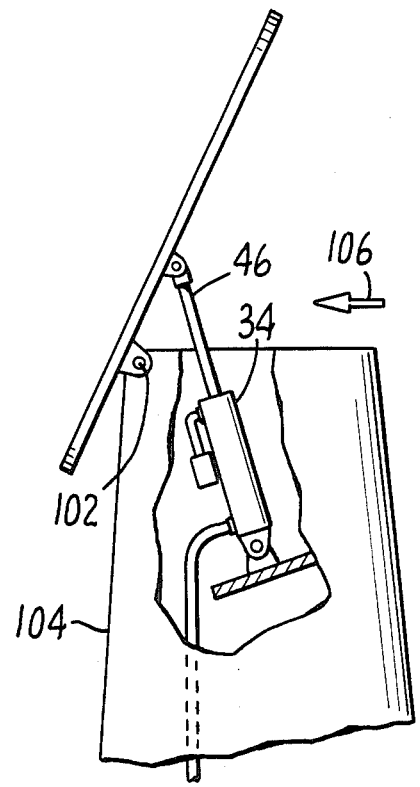
FIG. 8.
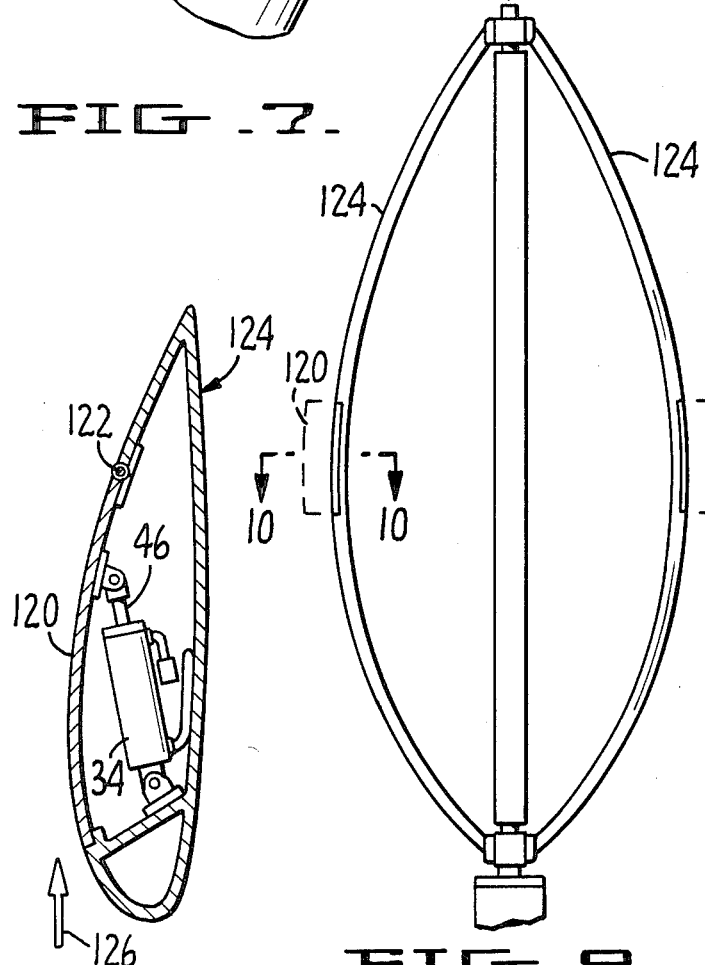
FIG. 9.
FIG. 10.
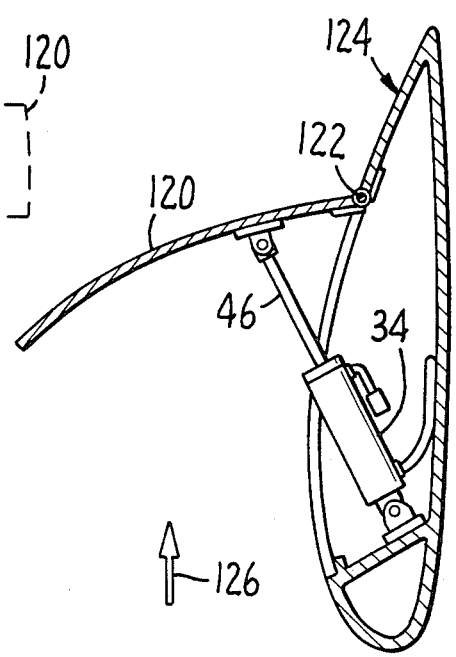
FIG. 11.

HYDRAULIC CONTROL DEVICE FOR WIND TURBINE

BACKGROUND OF THE INVENTION

1. Field of the Invention

This invention relates generally to speed limiting devices for wind turbines, and relates more particularly to a hydraulic speed control device for limiting the speed of a wind turbine rotor by controlling the deployment of braking tabs.

2. Description of the Relevant Art

Wind turbines have been used as a source of power for many years. One problem associated with the operation of wind turbines is that of speed control. Controlling the speed of a wind turbine rotor is necessary in order to avoid the damaging effects of high velocity winds on the wind turbine and its supporting structure. Most wind turbine rotors rotate at a speed that is directly related to the speed of the driving winds; that is, the faster the winds blow, the faster the rotor rotates. Structural damage due to over-stressing the turbine blades and rotor can occur if the rotational speed of the wind turbine is allowed to increase without limit.

Various devices and adjusting mechanisms have been used in the prior art to control the speed of horizontal axis wind turbines rotors. One approach to controlling the speed of rotors is to change the angle of attack of the blades so that the incident wind strikes the blades at an unfavorable angle, thus establishing an inefficient conversion of wind energy into rotational energy of the rotor. Instead of rotating each entire blade, another approach is to rotate a braking tab positioned at the tip of each blade in order to brake the rotor. Some implementations of this latter approach have utilized the centrifugal force generated by the rotor rotation as a force that tends to move the tabs to their braking positions, while opposing that movement with a mechanism that releases the tabs for movement to their braking positions only when the maximum desired rotor speed has been exceeded.

One example of a speed control device using blade tabs is disclosed in U.S. Pat. No. 4,374,631 issued Feb. 22, 1983 to Barnes, and entitled "Windmill Speed Limiting System Utilizing Hysteresis." In the Barnes speed control device, rotatable braking tabs are coupled to the tips of rotor blades through cam mechanisms that impart a twist to the tabs as they move radially outward due to centrifugal force. The outward movement of the tabs is opposed by a spring mechanism mounted in the hub of the rotor. When the rotational speed of the rotor exceeds a certain level, the spring mechanism releases the tabs, which then rotate to their braking position to slow the rotor.

While these and other prior art speed control devices are somewhat effective in controlling the speed of wind turbine rotors, some disadvantages are associated with their use. One disadvantage is that the rotational speed at which the blades or tabs are reset or realigned to their operational positions is often not independently adjustable from the rotational speed at which the blades or tabs are deployed to their braking positions. Another disadvantage of some prior art speed control devices is that the reset speed is just below the deployment speed, so that in high winds the tabs oscillate between the operational and braking positions without effectively slowing the wind turbine rotor to a safe speed. Another disadvantage is that all of the tabs may not be deployed in unison, which can create a dynamic imbalance of the rotor that causes structural damage. Still another disadvantage is that the speed control mechanism may fail in such a way that one or more of the tabs are locked into their operational positions and can not deploy to slow the rotor.

SUMMARY OF THE INVENTION

In accordance with the illustrated preferred embodiment, the present invention provides a hydraulic speed control device for limiting the speed of a wind turbine rotor by controlling the deployment of rotor braking devices. The hydraulic speed control device of the present invention is adapted for installation on a wind turbine rotor having one or more blades, with each blade including a rotor braking device that is movable between an aligned position for normal operation of the wind turbine and a braking position for slowing the rotor.

The hydraulic speed control device of the present invention includes four fluidicly interconnected elements: (1) one or more fluid cylinders, (2) a relief valve, (3) an accumulator, and (4) a check valve. Each of the fluid cylinders is mechanically coupled between a blade and its associated rotor braking device, and controls the movement of the rotor braking device between its aligned and braking positions according to the fluid pressure within the fluid cylinders. The relief valve is fluidicly coupled between the fluid cylinders and the accumulator, and opens to fluidicly connect the fluid cylinders and the accumulator when the rotational speed of the rotor exceeds a limit value. The accumulator receives fluid through the relief valve when the relief valve opens, thereby reducing the fluid pressure in the fluid cylinders and allowing the rotor braking devices to move from their aligned positions to their braking positions. The check valve is fluidicly coupled in parallel with the relief valve between the accumulator and the fluid cylinders, and permits fluid flow from the accumulator toward the fluid cylinders to return the rotor braking devices to their aligned positions when the rotational speed of the rotor has sufficiently slowed.

In the preferred embodiment, the fluid within the fluid cylinders and accumulator is hydraulic fluid. Preferably, the body of each fluid cylinder is mechanically coupled to the blade and the rod is mechanically coupled to the associated rotor braking device. The piston side ports of the fluid cylinders are vented to atmosphere through air filters, while the rod side ports are fluidicly connected to the relief and check valves. The pressure within the rod side of the cylinders counteracts the centrifugal forces acting upon the rotor braking devices, and keeps the rotor braking devices at their aligned positions so long as the rotational speed of the rotor does not exceed the maximum. Preferably, the relief valve is a differential pressure valve that opens when the pressure within the cylinders exceeds the pressure within the accumulator by an amount that corresponds to the maximum rotational speed of the rotor. When the differential pressure valve opens, fluid flows from the cylinder side of the valve to the accumulator side of the valve, which reduces the pressure within the cylinders and allows the rotor braking devices to deploy outward to their braking positions. After the rotational speed of the rotor has slowed sufficiently, the pressure within the cylinders overcomes the centrifugal force on the rotor braking devices and pulls the rotor braking devices back to their aligned positions.

The hydraulic speed control device of the present invention offers several advantages over prior art speed control devices. First, the hydraulic speed control device deploys and retracts all of the rotor braking devices in unison to preserve the dynamic balance of the rotor. Second, the hydraulic speed control device is fail safe in that a loss of hydraulic pressure will cause all of the rotor braking devices to deploy to slow the rotor. Third, the speed of deployment and retraction of the rotor braking devices can be controlled through the use of orifices in the hydraulic lines. Fourth, the rotor speeds at which rotor braking device deployment and retraction occur can be easily adjusted by changing the setting of the differential pressure valve and the pre-charge pressure and volume of the accumulator. Fifth, the rotor rotational speed at which rotor braking device deployment occurs can be established independently from the rotational speed at which rotor braking device retraction occurs. Sixth, deployment of the rotor braking devices is based directly on rotational speed of the rotor and not on an indirect sensing of the rotor speed through a sensor that could fail. Seventh, the hydraulic speed control device of the present invention can be easily scaled up or down for installation on a wide range of sizes of wind turbines.

The features and advantages described in the specification are not all inclusive, and particularly, many additional features and advantages will be apparent to one of ordinary skill in the art in view of the drawings, specification and claims hereof. Moreover, it should be noted that the language used in the specification has been principally selected for readability and instructional purposes, and may not have been selected to delineate or circumscribe the inventive subject matter, resort to the claims being necessary to determine such inventive subject matter.

BRIEF DESCRIPTION OF THE DRAWINGS

FIG. 1 is a perspective view of a wind turbine and rotor having rotatable tabs as a rotor braking device.

FIG. 2 is a perspective view partially in section of a coupling between a blade and tab, with the tab illustrated in an aligned position for normal operation of the wind turbine.

FIG. 3 is a perspective view partially in section of the coupling of FIG. 2, with the tab illustrated in a braking position for slowing the speed of the rotor.

FIG. 4 is a sectional view of the coupling between the blade and tab.

FIG. 5 is a side detail view of a cam mechanism portion of the coupling of FIG. 4, and is viewed according to arrows 5—5 of FIG. 4.

FIG. 6 is a schematic diagram of a hydraulic speed control device according to the present invention.

FIG. 7 is a perspective view of a wind turbine blade having a tip flap, which is an alternative rotor braking device that can be controlled by the hydraulic speed control device of the present invention. In FIG. 7, the tip flap is shown in its aligned position.

FIG. 8 is a side view of the tip flap of FIG. 7, and is shown in its braking position.

FIG. 9 is a side elevation view of a vertical axis wind turbine.

FIG. 10 is a sectional view of a spoiler flap utilized on the wind turbine of FIG. 9, with the sectional view taken along section lines 10—10 of FIG. 9. The spoiler flap, shown in its aligned position, is another alternative rotor braking device that can be controlled by the hydraulic speed control device of the present invention.

FIG. 11 is a sectional view of the spoiler flap of FIG. 10, shown in its braking position.

DETAILED DESCRIPTION OF THE PREFERRED EMBODIMENTS

FIGS. 1 through 11 of the drawings depict various preferred embodiments of the present invention for purposes of illustration only. One skilled in the art will readily recognize from the following discussion that alternative embodiments of the structures and methods illustrated herein may be employed without departing from the principles of the invention described herein.

The preferred embodiment of the present invention is a hydraulic speed control device for limiting the speed of a wind turbine rotor by controlling the deployment of braking tabs. As shown in FIG. 1, the preferred installation of the hydraulic speed control device is on a horizontal axis wind turbine 10 that utilizes braking tabs 12 at the tips of each blade 14 for purposes of speed control. A tower 16 supports the wind turbine 10 at a position elevated above the ground. The wind turbine 10 is pivotably mounted about the axis of the tower 16 so that the attitude of the wind turbine can be adjusted according to the prevailing direction of the wind. The blades 14 are mounted to a rotatable hub 18, which allows the blades to rotate about a horizontal axis when wind of sufficient strength is blowing. The blades 14 and hub 18 form the wind turbine rotor 20. The rotation of the rotor 20 drives an electrical generator, not shown, which may be mounted in pod 22, or may be mounted at ground level.

FIGS. 1, 2 and 3 illustrate the two positions of each tab 12. In FIGS. 1 and 2, the tab 12 is shown in its aligned position, where it acts as an extension of the blade 14 and helps to convert some of the energy of the wind into rotational energy of the rotor 2. In FIG. 3, the tab 12 is shown in its braking position, where it has extended radially outward and rotated from its aligned position. In the braking position, the tab 12 slows the rotation of the rotor 20 by acting against the incident air flow, which is represented by arrow 23 relative to the blade.

The coupling 24 between the tab 12 and the blade 14 is best shown in FIG. 4, which shows the blade extending toward the left of the figure and the tab extending toward the right of the figure. A stationary spar 26 extends radially outward from the end of the blade 14 and into the interior of the tab 12. The radially outward end of the spar 26 is terminated in a cap 28, from which two pins 30 extend in opposite lateral directions. Protruding from the end of the cap 28 is a clevis 32, upon which is mounted the body of a hydraulic cylinder 34. Thus, the hydraulic cylinder 34, clevis 32, pins 30, cap 28, and spar 26 are all fixed relative to the blade 14.

Coupled to the above-described structure is a structure that is fixed relative to the tab 12. A tube 36 extends radially within the tab 12 from the edge of the tab closest to the blade 14, to a mounting ring 38, which secures the radially outward end of the tube to the tab. The tube 36 is positioned concentric to the spar 26, with a bushing 40 providing support and guidance for the blade end of the tube 36. Adjacent to the cap 28 of the spar 26 is a guide sleeve portion 42 of the tube 36. The guide sleeve 42 includes two opposing cam slots 44, as best shown in FIG. 5, that mate with the pins 30 that extend laterally from the end of the spar 26. The rod 46 of the hydraulic cylinder 34 extends radially outward and is coupled through an extension plate 48 and two coupling joints 50 to an end plate 52, which is securely fastened to the tab 12 through the mounting ring 38.

The coupling 24 provides for radial and rotational movement of the tab 12 with respect to the blade 14. The tube 36 can move axially with respect to the spar 26, while the pins 30 in the spar and the cam slots 44 in the sleeve impart a rotation to the tube as it moves axially. Note that the axial movement of the tube 36 also causes a corresponding extension or retraction of the cylinder rod 46, since the rod is effectively coupled for movement with the tube.

The tube 36 and tab 12 are not actually free to move. The axial movement of the tube 36 and tab 12 is restricted by hydraulic pressure within the hydraulic cylinder 34. As shown in FIG. 6, the piston side port of each of the hydraulic cylinders 34 is vented to atmosphere through an air filter 54, while the rod side port of each of the cylinders is fluidicly coupled to the remainder of the hydraulic speed control device 56. Since pressurized hydraulic fluid resides on the rod side of the cylinder pistons 58 and atmospheric air resides on the other side of the pistons, there is a net force on the pistons opposing the extension of the cylinder rods 46. This force also opposes the axial movement of the tube 36 and the deployment of the tab 12.

In addition to the hydraulic cylinders 34, the hydraulic speed control device 56 includes a differential pressure valve 60, an accumulator 62, and a check valve 64. The high pressure port of the differential pressure valve 60 and the output port of the check valve 64 are fluidicly coupled to the rod side ports of the hydraulic cylinders 34, preferably through a variable orifice 66 and three fixed orifices 68, one for each of the three cylinders. The low pressure port of the differential pressure valve 60 and the input port of the check valve 64 are fluidicly coupled to the accumulator 62.

The speed control device 56 thus provides two fluidic paths between the hydraulic cylinder 34 and the accumulator 62: one path that flows from each cylinder through a fixed orifice 68 and the variable orifice 66 and through the differential pressure valve to the accumulator, and a second path the flows from the accumulator through the check valve 64 and through the variable orifice and a fixed orifice to each cylinder. The first path is open for fluid flow only when the pressure on the cylinder side of the differential pressure valve 60 (high pressure port) exceeds the pressure on the accumulator side of the differential pressure valve (low pressure port) by an amount that exceeds a preset value. This preset differential pressure value is selected so that the differential pressure valve will open at the point at which the rotational speed of the rotor 20 exceeds the maximum value. The second path is open for fluid flow when the pressure within the accumulator side of the check valve 64 is greater than the pressure within the cylinder side of the check valve.

When the rotor 20 is stationary, the hydraulic speed control device 56 is precharged to a predetermined pressure. As the rotor 20 begins to rotate, the centrifugal force on the tabs 12 tends to pull outward on the rods 46 and pistons 58 of the hydraulic cylinders 34. This centrifugal force is opposed by the pressure within the hydraulic cylinders. As the rotor 20 increases, the pressure within the cylinders 34 also increases. Note that only the pressure on the cylinder side of the device increases. The pressure on the accumulator side of the device remains at the precharged pressure because that side is isolated from the cylinder side of the device by the closed differential pressure valve 60 and the check valve 64. Due to the incompressibility of the hydraulic fluid, the cylinder rods do not extend outward, and, thus, the tabs 12 remain in their aligned positions.

As long as the rotor 20 does not exceed its maximum speed, the hydraulic speed control device 56 operates as described above. The maximum speed of the rotor is defined according to the pressure within the hydraulic cylinders 34 that causes the differential pressure valve 60 to open. When the maximum speed of the rotor is exceeded, the pressure applied to the high pressure port of the differential pressure valve minus the precharged pressure within the accumulator 62 is sufficient to cause the differential pressure valve to open. When the differential pressure valve 60 opens, high pressure hydraulic fluid flows from the cylinder side of the hydraulic speed control device 56 to the low pressure accumulator side of the device, thus reducing the pressure within the cylinders 34 and increasing the pressure within the accumulator 62. When the differential pressure valve 60 opens, the high pressure fluid on the cylinder side mixes with the low pressure fluid on the accumulator side to yield an intermediate pressure that depends upon the pressures and volumes of the cylinder side and accumulator side of the device just prior to the opening of the differential pressure valve. The reduction in the pressure within the hydraulic cylinders 34 allows the rods 46 to extend, which in turn allows the tube 36 to extend and rotate to deploy the tabs 12 to their braking positions.

The resistance to fluid flow provided by the orifices 66 and 68 regulate the flow of hydraulic fluid from the hydraulic cylinders 34, and, thus, regulate the speed at which the tabs deploy. Smaller orifices correspond to a slower deployment time, while larger orifices correspond to a faster deployment time. Once the pressure has equalized, the differential pressure valve 60 resets to again isolate its high and low pressure ports.

With the tabs 12 deployed to their braking positions, the rotor 20 slows down. Even though the rotor slows down, the cylinder rods 46 remain extended and the tabs 12 remain deployed because the centrifugal force on the rods still exceeds the intermediate pressure within the cylinders. The tabs 12 remain extended and rotated until the rotor 20 slows sufficiently so that the force on the pistons 58 due to the intermediate pressure within the cylinders overcomes the centrifugal force of the tabs and whatever frictional force opposes the inward movement of the tabs. At that point, the rods 46 retract, which in turn retracts the attached tubes 36 and tabs 12. During the inward movement of the tabs 12, the cam mechanisms cause the tabs to twist back to their aligned positions in line with the blades 14.

Also during the inward movement of the tabs 12, fluid flows through the check valve 64 from the accumulator side of the device toward the cylinder side of the device to accommodate the increased volume within the cylinders due to the retraction of the pistons 58 and rods 46. This increase in volume is accompanied by a corresponding decrease in pressure within both sides of the device 56. Once the rotor 20 stops, the pressure within the device will have returned to the precharged pressure.

The installation of the hydraulic speed control device 56 on a horizontal axis wind turbine with rotating tabs, as described above, is not the only environment in which the present invention will operate effectively to control the rotational speed of a wind turbine by controlling the movement of a rotor braking device. The hydraulic speed control device 56 will operate effectively whenever the hydraulic cylinders 34 are coupled to rotor braking devices that exert forces on the cylinders that are related to the rotational speed of the rotor, such as centrifugal force, and the pressure within the cylinders oppose the movement of the rotor braking devices from their aligned positions to their braking positions. Two additional types of rotor braking devices to which the hydraulic speed control device 56 may be coupled are described below.

One alternative installation of the hydraulic speed control device 56 is on a horizontal axis wind turbine having tip flaps. As shown in FIGS. 7 and 8, a tip flap 100 is pivotably coupled by a hinge 102 to the tip of a wind turbine blade 104. The tip flap 100 is moveable between an aligned position, as shown in FIG. 7 in solid lines, and a braking position, as shown in FIG. 7 in dashed lines and in FIG. 8. In the aligned position, the plane of the tip flap 100 is parallel to the relative air flow 106, so that the air flows cleanly around the tip flap. Thus, in the aligned position, the tip flap does not impede the rotation of the rotor. In the braking position, the plane of the tip flap 100 is rotated to a position nearly perpendicular to the relative air flow, causing the air flow to stall and exert a braking pressure on the tip flap and blade.

The movement of the tip flap 100 from its aligned position to its braking position is assisted by centrifugal force acting on the center of mass of the tip flap, which causes a rotational moment about the hinge 102 that tends to move the tip flap toward its braking position. However, this movement of the tip flap 100 is opposed by the pressure within the hydraulic cylinder 34. The cylinder 34 is pivotably coupled to the blade 104, while the cylinder rod 46 is pivotably coupled to the tip flap 102. Thus, the pressure within the rod side of the hydraulic cylinder 34 opposes the extention of the cylinder rod 46 and the deployment of the tip flap to its braking position. The hydraulic speed control device 56 operates in the same manner as described above to permit the tip flap 100 to move to its braking position when a limit speed of the rotor is exceeded, and retracts the tip flap to its aligned position when the rotor has slowed sufficiently.

Another alternative installation of the hydraulic speed control device 56 is on a vertical axis wind turbine having spoiler flaps. As shown in FIGS. 9, 10, and 11, a spoiler flap 120 is a rotor braking device that is pivotably coupled at hinge 122 to the radially outward side of a vertical axis wind turbine blade 124. In its aligned position, as shown in FIG. 10, the spoiler flap 120 forms the radially outward surface of the air foil shape of the blade 124, and, thus, does not disturb the air flow 126 as it passes by the blade. In its braking position, as shown in cross section in FIG. 11 and in dashed lines in FIG. 9, the spoiler flap 120 has pivoted radially outward, which causes the air flow to stall and exert a braking force on the blade.

The movement of the spoiler flap 120 from its aligned position to its braking position is assisted by centrifugal force acting on the center of mass of the spoiler flap, which causes a rotational moment about the hinge 122 that tends to move the spoiler flap toward its braking position. However, this movement of the spoiler flap 120 is opposed by the pressure within the hydraulic cylinder 34. The hydraulic cylinder 34 is pivotably coupled to the blade 124, while the cylinder rod 46 is pivotably coupled to the spoiler flap 122. Thus, the pressure within the rod side of the hydraulic cylinder 34 opposes the extention of the cylinder rod 46 and the deployment of the spoiler flap to its braking position. The hydraulic speed control device 56 operates in the same manner as described above to permit the spoiler flap 120 to move to its braking position when a limit speed of the rotor is exceeded, and retracts the spoiler flap to its aligned position when the rotor has slowed sufficiently.

From the above description, it will be apparent that the invention disclosed herein provides a novel and advantageous apparatus for a hydraulic speed control device for limiting the speed of a wind turbine rotor by controlling the deployment of braking tabs. The foregoing discussion discloses and describes merely exemplary methods and embodiments of the present invention. As will be understood by those familiar with the art, the invention may be embodied in other specific forms without departing from the spirit or essential characteristics thereof. For example, the relief valve, which is preferably a differential pressure valve, could instead be a fly-ball governor valve that is mounted for rotation with the rotor and that opens when the rotational speed of the rotor exceeds the maximum value. Accordingly, the disclosure of the present invention is intended to be illustrative, but not limiting, of the scope of the invention, which is set forth in the following claims.

What is claimed is:

1. A wind turbine apparatus comprising:
    a wind turbine rotor having one or more blades;
    one or more rotor braking devices each coupled to one of said blades, wherein each rotor braking device is movable between an aligned position for normal operation of said rotor and a braking position for slowing said rotor, and wherein the centrifugal force acting on said rotor braking devices during rotation of said rotor tends to move said rotor braking devices from said aligned positions to said braking positions;
    one or more fluid cylinders each mechanically coupled to a blade and its associated rotor braking device, wherein the fludic pressure within said fluid cylinders opposes the movement of the said rotor braking devices from said aligned positions to said braking positions;
    a variable orifice connected to said fluid cylinders for regulating the flow of fluid from the fluid cylinders and the deployment time of the rotor braking devices;
    pressure difference valve means fluidically coupled between said variable orifice and an accumulator for opening when the pressure within said fluid cylinders exceeds the pressure in the accumulator by a predetermined amount;
    accumulator means for receiving pressur from said fluid cylinders by way of said variable orifice when said pressure difference valve means is open so that the stored fluid is at at pressure which is intermediate between the pressure in said fluid cylinders and the pressure in said accumulator at the time the relief valve opens; and
    check valve means fluidically coupled in parallel with said pressure difference valve means between said accumulator means and said variable orifice for permitting pressurized fluid at said intermediate pressure to flow therethrough only in the direction from said accumulator means towards said fluid cylinders to return said braking devices to said aligned positions when the pressure in said accumulator means exceeds the pressure in said fluid cylinders, wherein said fluid cylinders pressure difference valve means, accumulator means, and check valve means form a pressurized, closed, fluidic system.

2. An apparatus as recited in claim 1 wherein a rod port of each fluid cylinder is fluidicly coupled to said pressure difference and check valve means and wherein a piston port of each fluid cylinder is vented to the atmosphere.

3. An apparatus as recited in claim 1 wherein said differential pressure valve is fluidicly coupled at a high pressure port thereof to said fluid cylinders and at a low pressure port thereof to said accumulator means, wherein said differential pressure valve opens to permit fluid flow therethrough when the fluid pressure at said high pressure port exceeds the fluid pressure at said low pressure port by an amount that corresponds to the maximum desired speed of said rotor.

4. An apparatus as recited in claim 3 wherein said accumulator means includes an accumulator chamber containing fluid at a predetermined pressure when said rotor is stationary, wherein said predetermined pressure also exists within said fluid cylinders when said rotor is stationary.

5. An apparatus as recited in claim 4 wherein said predetermined pressure within said accumulator chamber is selected in combination with the differential pressure that activates said differential pressure valve so that said differential pressure valve opens when said rotor is rotating at its maximum desired speed.

6. A wind turbine apparatus comprising:
a wind turbine rotor having two or more blades;
two or more rotor braking devices each associated with one of said blades, wherein each rotor braking device is movable between an aligned position for normal operation of said rotor and a braking position for slowing said rotor, and wherein the centrifugal force acting on said rotor braking devices diring rotation of said rotor tends to move said rotor braking devices from said aligned positions to said braking positions;
two or more hydraulic cylinders each mechanically coupled between a blade and its associated rotor braking device and each having a port in fluid communication with the interior of said hydraulic cylinder, wherein the fluidic pressure within each hydraulic cyclinder opposes the movement of said rotor braking devices from said aligned positions to said braking positions;
a variable orifice connected to said hydraulic cylinders for regulating the flow of fluid from the hydraulic cylinders and the deployment time of the rotor braking devices;
a differential pressure valve fluidicly coupled at a high pressure port thereof to said ports of said hydraulic cylinders through said variable orifice and operable for opening when the pressure at said high pressure port exceeds the pressure at a low pressure port thereof by a limit value;
an accumulator fluidicly coupled to said low pressure port of said differential pressure valve and operable for receiving pressurized fluid from said hydraulic cylinders by way of said variable orifice when said differential pressure valve is open, wherein said accumulator is operable for storing fluid under pressure intermediate between the pressure in said hydraulic cylinders and the pressure in said accumulator at the time the relief valve opens; and
a check valve fluidicly coupled between said accumulator and said variable orifice in parallel with said differential pressure valve and operable for permitting fluid flow at said intermediate pressure therethrough only in the direction from said accumulator toward said hydraulic cylinders in order to return said braking devices to said aligned positions, wherein said hydraulic cylinders, differential pressure valve, accumulator, and check valve form a pressurized, closed, fluidic system.

7. In a wind turbine rotor having one or more blades, one or more rotor braking devices each associated with a blade and each deployable from an aligned position for normal operation of the rotor to a braking position for slowing the rotor, and one or more fluid cylinders each mechanically coupled between a blade and its associated rotor braking device, wherein the centrifugal force acting on said rotor braking devices during rotation of said rotor tends to move said rotor braking devices from said aligned positions to said braking positions and is opposed by the fluidic pressure within said fluid cylinders, the improvement in combination with said rotor, rotor braking devices, and fluid cylinders comprising:
a variable orifice connected to said fluid cylinders for regulating the flow of fluid from the fluid cylinders and the deployment time of the rotor braking devices;
an accumulator operable for storing fluid under pressure;
a differential pressure valve fluidicly coupled between said accumulator and said variable orifice and operable for allowing pressurized fluid to flow from said fluid cylinders and into said accumulator when the pressure in said fluid cylinders exceeds the pressure within said accumulator by a limit value so that the stored fluid is at a pressure intermediate between the pressure in said hydraulic cylinders and the pressure in said accumulator at the time the relief valve opens; and
a check valve fluidicly coupled in parallel with said differential pressure valve between said accumulator and said variable orifice and operable for allowing fluid to flow at said intermediate pressure from said accumulator and into said fluid cylinders to return said braking devices to said aligned positions when the pressure in said accumulator exceeds the pressure within said fluid cylinders, wherein said fluid cylinders, accumulator, differential pressure valve, and check valve form a pressurized, closed fluidic system.

* * * * *